United States Patent [19]

Casasent et al.

[11] 4,285,048
[45] Aug. 18, 1981

[54] SPACE VARIANT SIGNAL PROCESSOR

[75] Inventors: David P. Casasent; Demetri Psaltis, both of Pittsburgh, Pa.

[73] Assignee: The United States of America as represented by the Secretary of the Army, Washington, D.C.

[21] Appl. No.: 52,386

[22] Filed: Jun. 27, 1979

[51] Int. Cl.³ .......................... G06G 9/00; G06G 7/19
[52] U.S. Cl. ............................ 364/822; 343/100 CL; 364/815
[58] Field of Search ................... 364/822, 815; 343/9, 343/100 CL

[56] References Cited

U.S. PATENT DOCUMENTS

| 3,202,990 | 8/1965 | Howels | 343/100 CL X |
|---|---|---|---|
| 3,519,331 | 7/1970 | Cutrona et al. | 364/822 |
| 3,596,182 | 7/1971 | Menard | 364/822 X |
| 3,903,407 | 9/1975 | Burnham | 343/100 CL X |
| 3,906,213 | 9/1975 | Meriaux et al. | 343/100 CL X |
| 3,925,730 | 12/1975 | De Rosa | 343/100 CL X |
| 4,028,699 | 6/1977 | Stevens | 343/9 |
| 4,114,153 | 9/1978 | Neidell | 343/9 |
| 4,123,142 | 10/1978 | Fleming et al. | 364/822 X |
| 4,163,205 | 7/1979 | Barron | 343/100 CL X |
| 4,187,000 | 2/1980 | Constant | 364/822 X |

Primary Examiner—Felix D. Gruber
Attorney, Agent, or Firm—Jeremiah G. Murray; Edward Goldberg

[57] ABSTRACT

A correlation method and apparatus for electrical signal transmission and reception of coded waveforms are disclosed which makes use of a coordinate transformation of the original waveform prior to transmission, effecting an inverse coordinate transformation upon reception and then correlating the resultant waveform with the original waveform. More particularly, the coordinate transformation and its inverse comprises a non-linear transformation preferably of the logarithmic type which when utilized in an electro-optical signal processor of a radar system, for example, provides Doppler invariant output data, as well as additional noise immunity.

19 Claims, 13 Drawing Figures

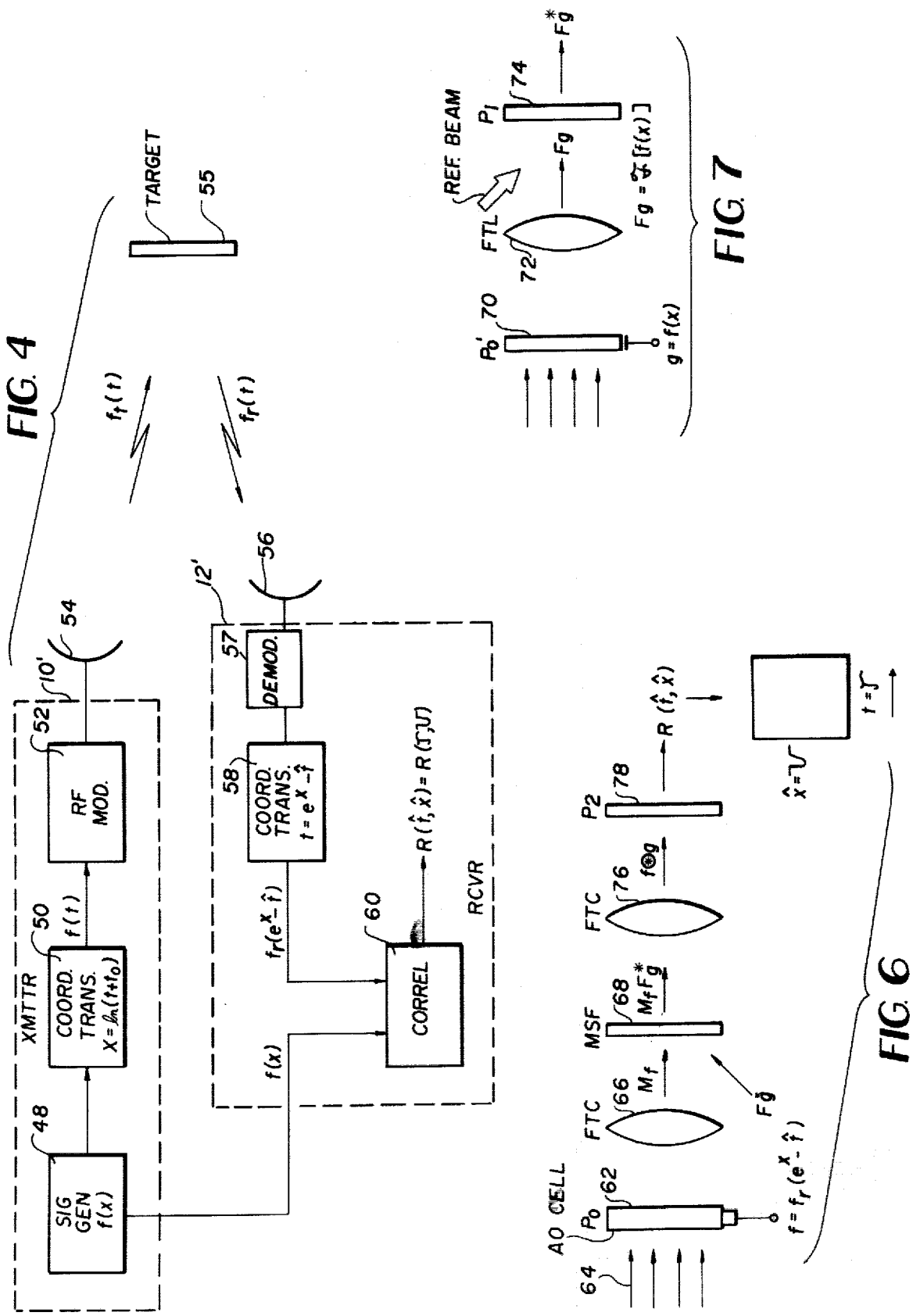

FIG. 5A
LINEAR BARKER CODE
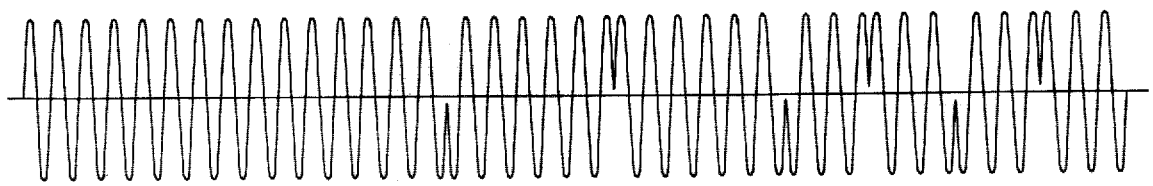
FIG. 5B
NONLINEAR BARKER CODE
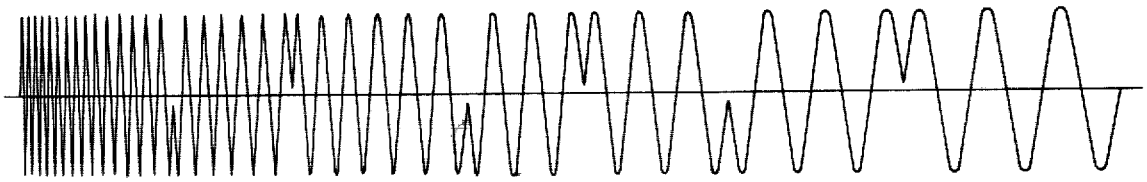
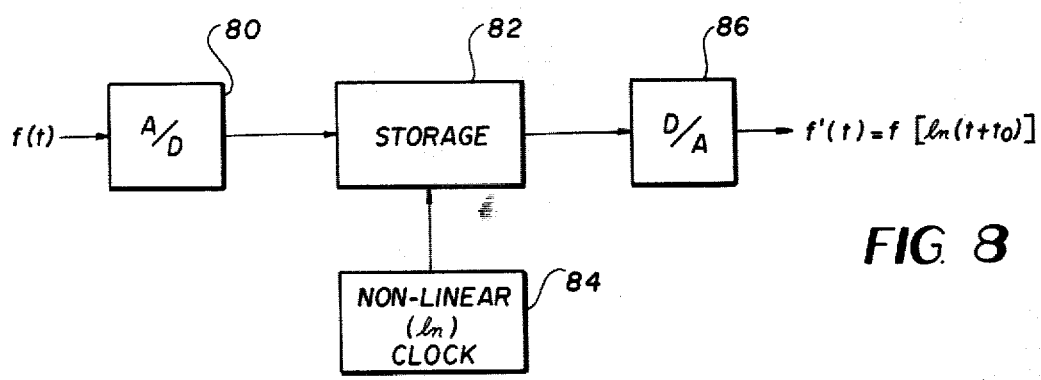
FIG. 8
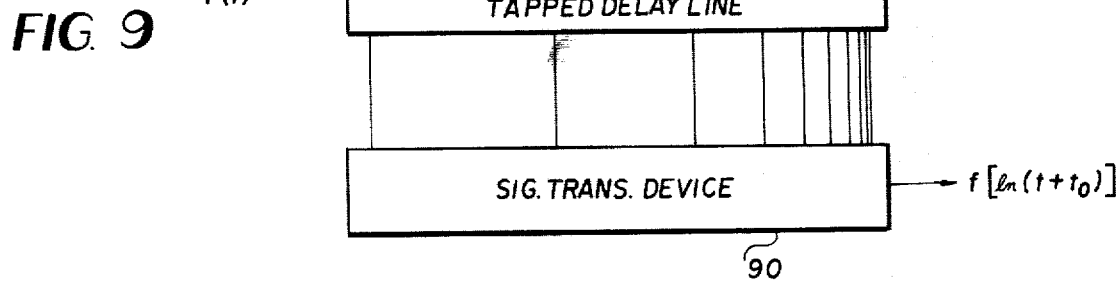
FIG. 9

4,285,048

SPACE VARIANT SIGNAL PROCESSOR

The invention described herein may be manufactured, used and licensed by or for the government for governmental purposes without the payment of any royalties thereon.

BACKGROUND OF THE INVENTION

This invention relates generally to electrical signal processing means and more particularly to correlation apparatus and methods utilizing coordinate transformation of the Mellin transform type.

Processing of data via optical means is well known in the art, the primary advantage being that optical processing of large amounts of data is achieved in a highly parallel substantially instantaneous manner. Additionally, coherent optical processors have been proposed to perform many and varied functions, including Fourier transformation analysis of analog signals and the correlation therebetween.

In applicants' prior patents, namely U.S. Pat. Nos. 4,071,907; 4,073,010; 4,084,255; and 4,099,249 there are disclosed among other things methods and apparatus for correlating by optical apparatus two functions which are logarithmic scaled and thereafter Fourier transformed to produce Mellin transforms that are scale and shift invariant. Moreover, such signal processing when carried out in connection with radar signals having Doppler information, this information appears in the location of the correlation peak of the processor output. The patent references referred to above moreover disclose not only means for optically performing signal and dual dimensional Fourier transforms, but also means for optically implementing a holographic matched spatial filter. These patents may be referred to for a more detailed treatment of this type of optical correlator and moreover, are meant to be incorporated by reference in the present specification.

SUMMARY

It is an object of the present invention, therefore, to provide a new and improved correlation signal processor which exhibits enhanced noise rejection.

It is a further object of the present invention to provide a system of the type described which when utilized in connection with a radar or a communication system is immune to jamming.

It is yet a further object of the present invention to provide a system which when used in a communications apparatus or a pulsed radar renders its pulse repetition frequency incapable of being detected by an undesired party.

Briefly, the subject invention is directed to a system wherein coded waveforms are transmitted and thereafter received with a subsequent signal correlation being made for extracting data of a desired type which is available at the location of the correlation peak. The present invention comprises a method and apparatus for generating a reference signal f(x), effecting a non-linear coordinate transformation of the signal f(x), preferably of the type $x = \ln(t - t_0)$ with a signal $f_t(t) = f[\ln(t-t_0)]$ resulting therefrom, transmitting the signal $f_t(t)$ to an external remote location, thereafter detecting the $f_t(t)$ signal or receiving a reflected return signal $f_r(t)$ of the transmitted signal from the remote location, effecting an inverse non-linear coordinate transformation of the type $\hat{t} = e^x - t$ and providing a signal $f_r(e^x - \hat{t})$ thereby, correlating the resultant waveform $f_r(e^x - \hat{t})$ with the original waveform f(x) and then outputting the results of the correlation. Such a system substantially effects a Mellin type transform and accordingly yields data which is scale invariant.

DESCRIPTION OF THE DRAWINGS

FIG. 4 is a block diagram illustrative of the preferred embodiment of a system for practicing the subject invention;

FIGS. 5A and 5B are illustrative of a linear and non-linear waveform of a Barker code;

FIG. 6 is a block diagram illustrative of an optical correlator for use in the system shown in FIG. 4;

FIG. 7 is a diagram illustrative of an embodiment of a matched spatial filter for providing the complex conjugate of a Fourier transform;

FIGS. 8 and 9 comprise block diagrams of two possible implementations for means for making the $x = \ln(t + t_0)$ coordinate transformation of the original waveform prior to transmission in the system shown in FIG. 4.

DESCRIPTION OF THE PREFERRED EMBODIMENT

Briefly and in somewhat general terms, it is well known that the scale invariant Mellin transform of a function can be obtained by taking the Fourier transform of the function which has undergone an exponential coordinate transformation. Thus for a function f(x), the Mellin transform of f(x) can be obtained by taking the Fourier transform of the scaled function $f(e^x)$, i.e. $F[f(e^x)]$. Furthermore, it can be shown, for example by reference to U.S. Pat. No. 4,073,010, that a scale and shift invariant transform results if the Mellin transform of the magnitude of the Fourier transform of the input data is taken. This comes about from the scale invariance of the magnitude of the Mellin transform and the shift invariance of the magnitude of the Fourier transform.

Figure 1:
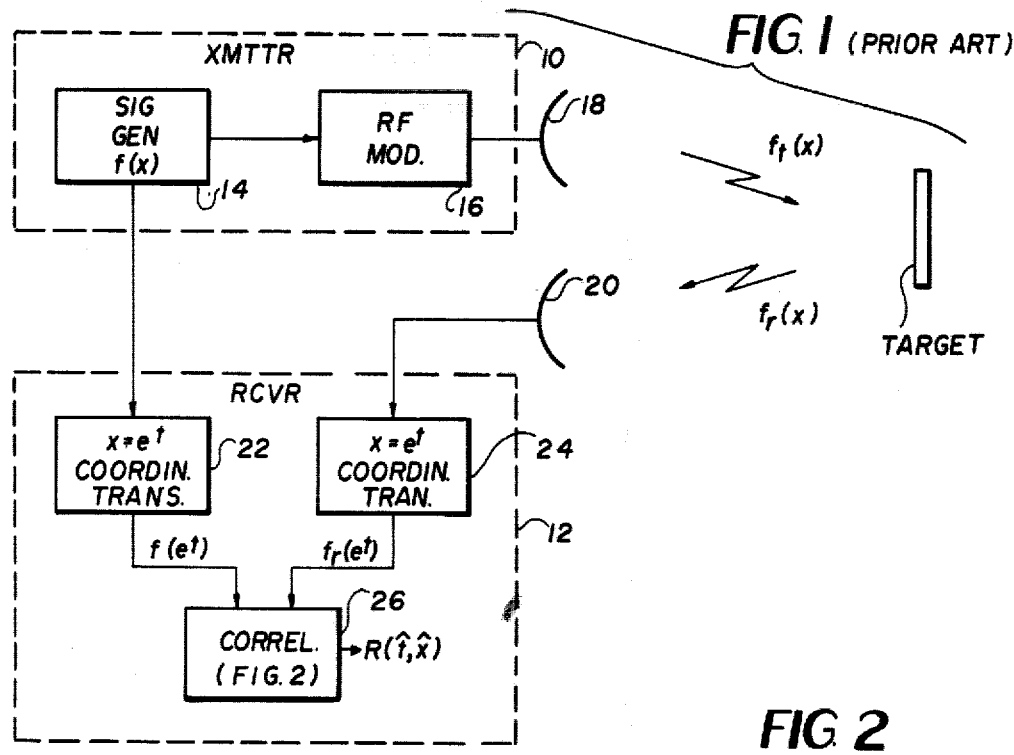
FIG. 1 is a block diagram illustrative of a typical prior art signal transmission and receiving system such as a radar which makes use of the Mellin transform.

In view of the foregoing, reference is now made to FIG. 1 which is intended to illustrate typical prior art use of Mellin transforms in connection with a radar system for determining a Doppler parameter of an illuminated target. Reference numerals 10 and 12 respectively designate the transmitter and receiver portions of a radar system transmitting a coded waveform f(x) generated by a signal generator 14. The output of the signal generator 14 when fed to an RF modulator 16, is adapted to radiate a signal $f_t(x)$ from an antenna 18. The return signal from the target constitutes a signal $f_r(x)$ which is received by the antenna 20. It should be noted, however, that the antennas 18 and 20 when desirable, may constitute a single structure in a manner well known to those skilled in the art.

The receiver portion 12 is shown including two separate coordinate transformation means 22 and 24 of the type $x=e^t$ which may be implemented for example by means of logarithmic amplification circuits to provide respective outputs of $f(e^t)$ and $f_r(e^t)$ respectively. These two signal functions when fed to a signal correlator 26, will output a two dimensional ambiguity function which is adapted to provide a representation having coordinates $\hat{t}$ and $\hat{x}$ which are a function of space and time and wherein $\hat{x}$ corresponds to Doppler and $\hat{t}$ corresponds to range.

Figure 2:
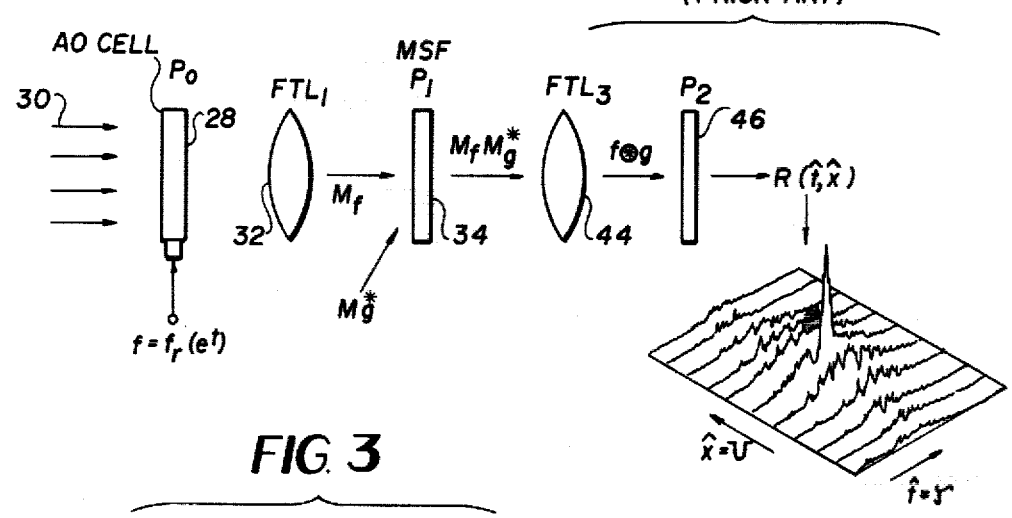
FIG. 2 is a schematic diagram illustrative of a Mellin transform optical correlator typically illustrative of the prior art.
Figure 3:
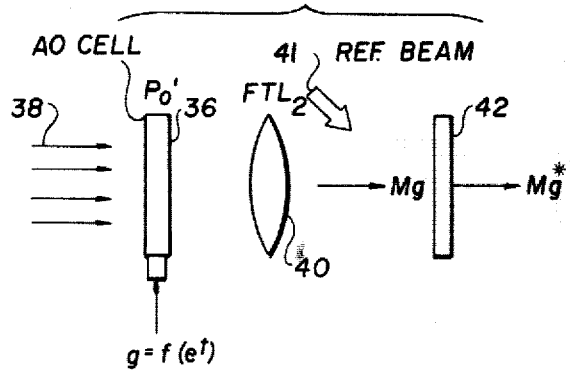
FIG. 3 is a schematic diagram illustrative of a matched spatial filter for providing the complex conjugate of a Mellin transform.

Although not limited to such an arrangement, the correlator 26 typically comprises an optical correlator of the type using well known optical elements for performing the Fourier transform and for implementing a matched spatial filter. Although such apparatus is shown and described in the aforementioned referenced patents, FIGS. 2 and 3 are intended to further illustrate optical correlation apparatus wherein the use of acousto-optical cells are utilized to input the various electrical signals into the correlator. Acousto-optical devices in such apparatus are well known, being shown for example in the electro-optical correlator disclosed in U.S. Pat. No. 3,432,647 issued to R. M. Wilmotte on Mar. 11, 1969.

Referring now to FIG. 2, reference numeral 28 designates an acousto-optical cell which is adapted to input the received signal $f_r(e^t)$. The acousto-optical cell 28 is illuminated by means of a monochromatic light beam 30 from a laser source, not shown, and the transmittance pattern of the $P_0$ plane is applied through a one dimensional Fourier transform lens arrangement 32 which since the input signal has been previously transformed exponentially, the lens 32 in effect outputs the Mellin transform $M_f$ of the received signal $f_r(x)$ which is then imaged onto a matched spatial filter (MSF) 34 which contains an image corresponding to the complex conjugate $M^*$ of the Mellin transform of the reference signal $f(x)$, i.e. $M^*_g$ where $g=f(e^t)$ and $e^t=x$. This is implemented by means of the apparatus shown in FIG. 3 and includes a second acousto-optical cell 36 which is also adapted to be illuminated by a light beam 38 and receives an input signal thereto corresponding to $g=f(e^t)$ from the reference signal generator 14. The image formed on the plane $P_0'$ of the apparatus shown in FIG. 3 produces a light distribution pattern which is applied through a second Fourier transform lens arrangement 40 to effect a Mellin transform $M_g$ of the signal $g=f(e^t)$. A reference beam 41 is focused onto the plane 42, whereupon an interference pattern with the light distribution $M_g$ causes the complex conjugate light pattern $M^*_g$ to be formed on the output side of plane 42. The optical pattern corresponding to $M^*_g$ is then imaged onto a plane $P_1$ of a second matched space filter element 34 shown in FIG. 2. An interference pattern multiplying $M_f$ and $M^*_g$ occurs with resulting light distribution pattern being coupled to a third Fourier transform lens arrangement 44 which is operative, in a well known manner, to provide a correlation of the function f and g, i.e. f⊛g which is then imaged as an ambiguity function on an output plane $P_2$ and designated by reference numeral 46 having rectangular coordinates of $\hat{t}$ and $\hat{x}$.

The foregoing now having been made by way of further background of a prior art system making use of the Mellin transform for developing a Doppler invariant signal, reference is now made to the embodiment of the subject invention which is disclosed in FIGS. 4–12. Turning attention now to FIG. 4, reference numerals 10' and 12' denote the transmitter and receiver portions of a radar system including a reference signal generator 48 which is adapted to generate a signal f(x) which comprises a coded waveform preferably of the phase modulated type, $$f(x) = \cos[\omega_0 x + \phi(x)] = a(x) \cos(\omega_0 x) \quad (1)$$

where $a(x) = \exp.[j\phi(x)]$, $\omega_0$ is the carrier frequency, $\phi$ denotes the phase modulation, and $a(x)$ denotes the corresponding bi-polar binary amplitude modulation. A typical example of this type of code is a linear Barker code and is illustrated in FIG. 5A. Whereas in prior art systems this is the coded waveform which is transmitted, in the present invention the coded waveform f(x) shown in FIG. 5A undergoes a non-linear and more particularly a logarithmic coordinate transformation (CT) of the form $x = \ln t$ as shown in FIG. 5B. Accordingly, the coded waveform $f(x) = \cos[\omega_0 x + \phi(x)]$ is applied to a coordinate transformation device 50, which is adapted to accomplish the transformation $$x = \ln(t + t_0) \quad (2)$$

The $t_0$ variable in equation 2 is necessary since $\ln 0 = -\infty$ and because it is desirable and in fact necessary to make the coordinate transformation at all points along the waveform starting at the zero point. The output of the coordinate transformation means 50 comprises a signal $$f_t(t) = \cos[\omega_0 \ln(t+t_0) + \phi[\ln(t+t_0)]] \quad (3)$$

which is coupled to an RF modulator 52 causing a transmitted signal $f_t(t)$ to be radiated from the antenna 54. The radiated signal $f_t(t)$ comprises a signal wherein the coordinate transformation $x = \ln(t+t_0)$ is applied to the RF carrier as well as the code.

The received signal $f_r(t)$ reflected from the target 55 is picked up by a receiving antenna 56. This received signal comprises a Doppler shifted and/or range delay version of the transmitted signal $f_t(t)$. The received signal $f_r(t)$, after passing through a demodulator 57, is now applied to a second coordinate transformation means 58 in the receiver portion 12' which is adapted to perform the inverse $(CT^{-1})$ coordinate transformation $t = e^x - \hat{t}$ which yields a new signal function $f_r(e^x - \hat{t})$. Following the inverse coordinate transformation of the received signal, the $f_r(e^x - \hat{t})$ signal outputted from the coordinate transformation means 58 is correlated with the original coded waveform f(x) in a correlator 60 which, for example, comprises an optical correlator to provide a correlation output in terms of $\hat{t}$ and $\hat{x}$ where $\hat{x}$ is the Doppler or correlation variable $v$ and $\hat{t}$ is the continuously variant time variable $\tau$.

Referring now to FIGS. 4 and 6, the optical correlator 60, for example, may be comprised of an acousto-optical cell 62 which is adapted to receive as an input signal $f = f_r(e^x - \hat{t})$. The signal is formed on the image plane $P_0$ and is illuminated by means of a light beam 64. The transmittance pattern is directed to a Fourier transform lens arrangement 66 which effects a Mellin transform $M_f$ of the signal f inputted to the $P_0$ plane 62. The light pattern corresponding to the Mellin transform $M_f$ is directed to a matched spatial filter 68 which also receives the complex conjugate pattern $F^*_g$ of the reference waveform $g = f(x)$ in a manner such as shown in FIGS. 6 and 7, whereupon a second acousto-optical cell 70 has applied thereto signal g corresponding to the reference waveform f(x). This signal is formed on an input plane $P_0'$ and applied to a Fourier transform lens arrangement 72 which directs a light pattern $F_g = F[f(x)]$ to an interference plane 74 which when illuminated by a reference beam, is adapted to output the complex conjugate light pattern $F^*_g$. Accordingly, the matched spatial filter element 68 is adapted to multiply the light patterns $M_f$ and $F^*_g$ together, which when fed to a Fourier transform lens arrangement 76, provides the optical correlation $f \circledast g$ at the $P_2$ output plane 78 which is adapted to display ambiguity function coordinates of $\hat{t}$ and $\hat{x}$. This displays the Doppler and range data, as in the prior art considered earlier, and therefore constitutes a modified type of Mellin transform correlator; however, the noise has been greatly reduced by the two (CT and $CT^{-1}$)coordinate transformations. The use of the non-linear coded waveform therefore results in non-linear spread spectrum transmission having many desirable properties, namely such a system as shown in FIG. 4 exhibits a large noise immunity to jamming and interference for the same reason that spread spectrum systems enjoy such noise immunity. The reason for this is that if noise which can be expressed as n(t) is received along the transmitted signal $f_r(x)$, the $CT^{-1}$ coordinate transform performed on the noise results in $n(e^x)$. There is a vast difference between n(t) and $n(e^x)$ because of the spatial distribution of the noise. Accordingly, if n(t) is discrete, $n(e^x)$ is spread and thus far less of the noise signal passes the bandwidth of f(x). Additionally, when f(x) and $n(e^x)$ are correlated even more noise rejection results. Still more rejection occurs with a coded waveform. The non-linear coordinate transformation produces an even greater level of noise and jammer rejection. Also, since the carrier is also non-linear, its pulsed repetition frequency can also not be easily detected.

What remains to be described are illustrative embodiments of the coordinate transformation means 50 and 58 shown in FIG. 4. Turning to the initial coordinate transformation of the original f(x) waveform, reference to FIGS. 8 and 9 respectively illustrate digital and analog versions of means for accomplishing the $\ln(t + t_0)$ transformation. With respect to FIG. 8, the digital implementation shown therein in its simplest form, includes an analog to digital converter 80 which is adapted to receive as an input the f(x) coded waveform outputted by the signal generator 48. The digital representation of the f(x) waveforms is fed into a digital storage 82 of any conventional type. The storage is coupled to and under the control of a non-linear and more particularly, a logarithmic clock source 84. The clock source 84 accordingly is operable to logarithmically output the contents of the storage 82 which is then reconverted in a digital to analog converter 86. The output of the D/A converter 86 is fed to the RF modulator 52 which generates a logarithmically varying carrier signal.

Because the original waveform f(x) is in analog form for the system shown in FIG. 4, the analog coordinate transformation means shown in FIG. 9 illustratively consists of a non-linear tapped delay line 88, whose output taps are arranged on a logarithmic $x = \ln(t)$ basis. The logarithmic output of the delay line 88 is next fed to a suitable signal translation device 90 which operates to output the logarithmic function $f[\ln(t + t_0)]$. It should be pointed out, however, that two embodiments shown in FIGS. 8 and 9, when desirable, could be implemented electro-optically in a manner similar to the discussion to follow.

Inasmuch as optical correlation is illustratively disclosed in FIG. 4 for developing the desired output parameter which in the case of the subject embodiment comprises a Doppler invariant signal, the inverse coordinate means 58 shown in FIG. 4 naturally lends itself to an electro-optical implementation and when desirable, may be combined with or actually substituted for the input element 62 shown in FIG. 6.

Figure 10:
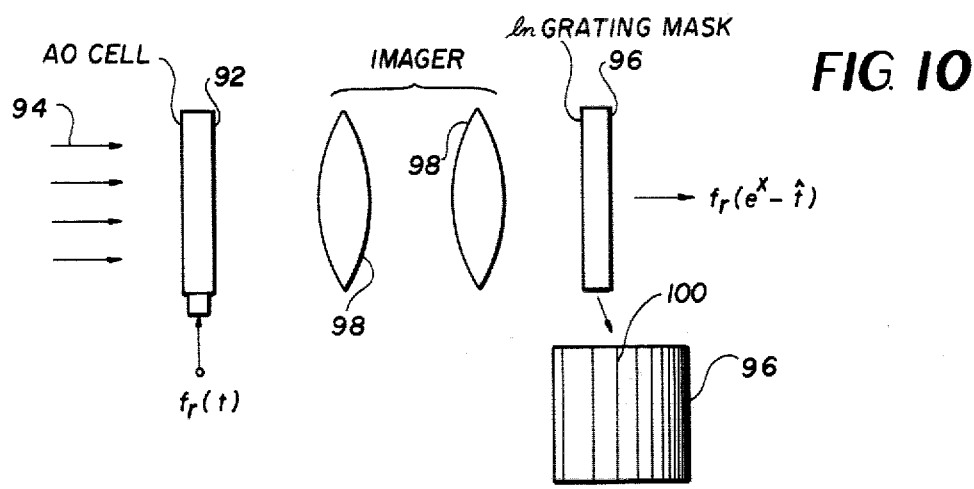
FIGS. 10, 11 and 12 are three illustrative examples of means for making the inverse $t = e^x - \hat{t}$ coordinate transformation of the received signal in the system shown in FIG. 4.

In the first version disclosed in FIG. 10, there is shown an acousto-optical cell 92 having an input signal $f_r(t)$ applied thereto which is the received signal picked up by the antenna 56. A collimated beam of light 94 causes a transmittance pattern to be coupled to an optical mask 96 via an optical imaging lens arrangement 98. The mask 96 includes a logarithmic grating arrangement 100 which is operable to exponentially provide the inverse transform of $t = e^x - \hat{t}$. This optical distribution pattern can be reconverted into an electrical signal for transmission or it can be directly used as the input plane 62 in the receiver processor shown in FIG. 6.

Figure 11:
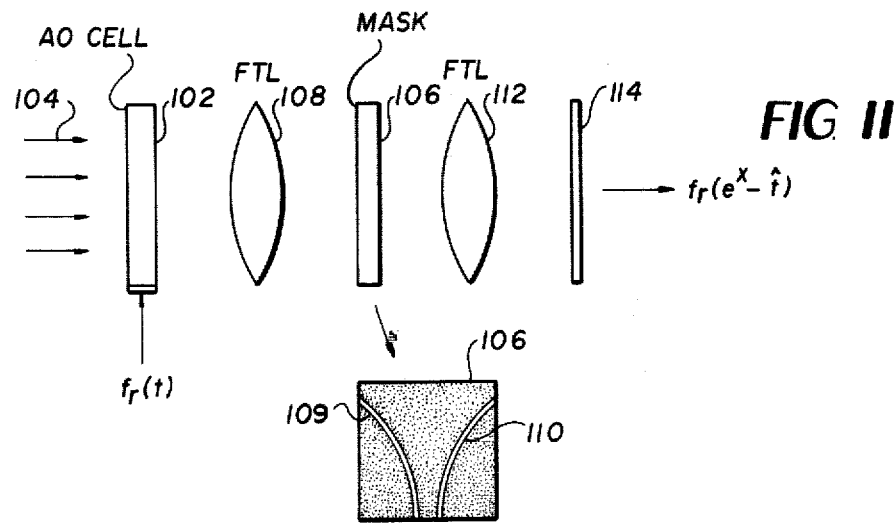

In the implementation shown in FIG. 11, the received signal $f_r(t)$ is applied to an acousto-optical cell 102 radiated by a light beam 104 whereupon an image is coupled to a mask 106 through a Fourier transform lens 108. The optical mask 106, moreover, is non-transparent except for a pair of logarithmically formed slits 109 and 110. The mask 106 is adapted to operate on a light pattern in the Fourier domain, whereas the mask 96 (FIG. 10) operates on the signal in the space domain. A Fourier lens 112 is located adjacent the mask 106 which forms the desired space version of the coordinate transformed signal. An output plane 114 provides a light distribution pattern of $f_r(e^x - \hat{t})$ which can be converted back to an electrical signal for transmission usage or used as the input plane 62 for the Fourier transform lens 66 shown in FIG. 6.

Figure 12:
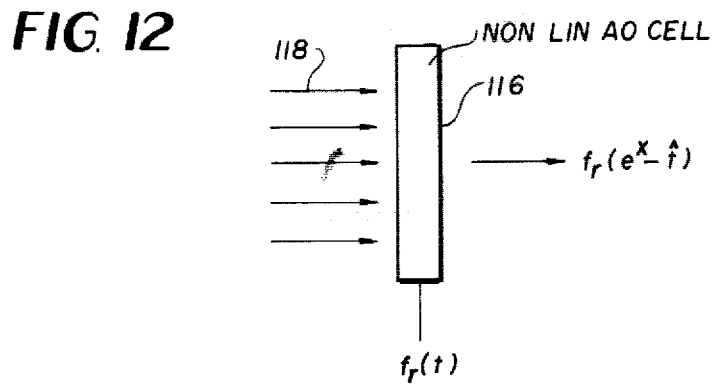

The simplest and most compact implementation of the inverse coordinate transformation means 58 comprises a single acousto-optical cell 116 as shown in FIG. 12 which is configured to have a logarithmic varying acoustic velocity transversely thereacross. Alternatively, the cell can be configured to have a varying index of refraction to the light beam 118 impinging thereon or the acousto-optical cell can be constructed so as to be sensitive to an externally applied field which when applied is adapted to effect a logarithmic light pattern output which can be applied directly to the Fourier transform lens 66 shown in FIG. 5.

While the three embodiments shown in FIGS. 10, 11 and 12 employ electro-optical configurations, it is to be noted that when desirable, the same coordinate transformation may be implemented in a manner similar to that shown by the purely electrical coordinate transformation means shown in FIGS. 8 and 9.

Accordingly, what has been shown and described is an electrical signal processor whose initial or reference waveform is first coordinate transformed, transmitted and upon receipt inverse coordinate transformed with the resulting signal then being correlated with the reference waveform. Furthermore, the coordinate transformation is generally of the non-linear type which is acceptable for some communications applications; however, for special applications such as when Doppler information is desired to be derived from a radar return signal the coordinate transformation must be of the logarithmic type, which effectively results in a Doppler invariant signal being produced.

Having thus shown and described what is at present considered to be the preferred embodiments of the present invention, modifications thereto will readily occur to those skilled in the art. It is not desired, therefore, that the invention be limited to the specific arrangements which have been shown and described, but it is intended that all modifications and alterations which encompass the spirit and scope of the invention as defined in the appended claims are meant to be included.

What we claim is:

1. A method for processing and correlating two signal waveforms, comprising the steps of:
    generating a reference signal waveform;
    applying a coordinate transformation to said reference signal waveform;
    generating a carrier signal;
    transmitting the carrier signal modulated by said transformed signal waveform to a remote location;
    receiving and demodulating the transmitted signal waveform returned from the remote location; applying an inverse coordinate transformation with respect to the above mentioned coordinate transformation to the received signal waveform;
    correlating the inversely transformed received signal waveform with said reference signal waveform to obtain an output signal; and
    generating a representation of said output signal.

2. The method as defined by claim 1 wherein said coordinate transformation comprises a non-linear coordinate transformation.

3. The method as defined by claim 2 wherein said non-linear coordinate transformation comprises a logarithmic coordinate transformation.

4. The method as defined by claim 3 wherein said reference signal waveform comprises a linear coded waveform.

5. A method as defined by claim 2 wherein said non-linearly coordinate transformed coded waveform modulates said carrier signal prior to said transmitting step.

6. The method as defined by claim 1 wherein said reference signal waveform comprises a signal f(x), the non-linear coordinate transformation comprises the transformation $x = \ln(t + t_0)$ and wherein the inverse coordinate transformation comprises the transformation $t = e^x - \hat{t}$.

7. The method as defined by claim 6 wherein a reference signal waveform f(x) comprises the function $\cos[\omega_0 x + \phi(x)]$ wherein $\omega_0$ is the carrier frequency and $\phi$ denotes phase modulation.

8. The method as defined by claim 1 wherein said reference signal waveform comprises a bi-phase coded waveform which is adapted to modulate a carrier signal prior to said transmitting step.

9. The method as defined by claim 1 wherein said step of correlating comprises the step of optically correlating the inversely transformed received signal with said reference signal waveform.

10. The method as defined by claim 9 wherein said step of generating a representation comprises generating the ambiguity function.

11. A signal processing system of a correlation type including electrical signal transmitting and receiving means wherein the improvement comprises:
    signal generator means in said transmitter means providing a reference signal;
    first coordinate transformation means in said transmitter means coupled to said signal generator means and being responsive to said reference signal to generate a signal therefrom having a predetermined non-linear coordinate transformation of the reference signal;
    carrier signal generating means in said transmitter means coupled to said first coordinate transformation means and being responsive to said signal having said predetermined non-linear coordinate transformation to generate a carrier signal which is modulated thereby and which is subsequently transmitted to an external location;
    means for receiving and demodulating a reflected return signal from said external location;
    second coordinate transformation means in said receiver means and being responsive to the received signal from said external location, said received signal corresponding to the transmitted signal having said non-linear coordinate transformation and being operable to generate a signal having an inverse coordinate transformation relative to said non-linear coordinate transformation;
    signal correlation means coupled to said reference signal and said signal having said inverse coordinate transformation for providing a correlation peak indicative of a predetermined data parameter; and
    means coupled to said signal correlation means for generating a representation of said predetermined data parameter.

12. A system as defined by claim 11 wherein said reference signal comprises a coded waveform signal and wherein said first coordinate transformation means generates a signal having a logarithmic coordinate transformation of said coded waveform.

13. The system as defined by claim 12 wherein said reference signal comprises a signal f(x), the non-linear transformation comprises the transformation $x = \ln(t + t_0)$ and wherein the inverse coordinate transformation comprises the transformation $t = e^x - \hat{t}$.

14. The system as defined by claim 13 wherein said signal correlation means comprises an optical correlator.

15. The system as defined by claim 11 wherein a selective one of said first and second coordinate transformation means includes an analog to digital (A/D) converter, a digital storage means coupled to said A/D converter, control means coupled to said storage means and being operable to periodically output the contents of said storage means in a predetermined non-linear time frame, and a digital to analog converter coupled to the storage means and being responsive to the output of said storage means to provide a non-linear analog output signal as a function of time.

16. The system as defined by claim 11 wherein a selective one of said first and second coordinate transformation means includes a tapped delay line having a plurality of non-linearly arranged output taps, and signal translation means coupled to said output taps to provide a non-linear analog output signal as a function of time.

17. The system as defined by claim 11 wherein a selective one of said first and second coordinate transformation means includes an acousto-optical cell coupled to the signal to be transformed and having a monochromatic light source directed thereto for forming a transmittance pattern of light of said signal to be transformed, optical imager means located adjacent said acousto-optical cell, and an optical mask having said transmittance pattern directed thereto by said imager means, said optical mask having a non-linear optical grating pattern formed thereon and being operative to optically effect said predetermined non-linear coordinate transformation on said transmittance pattern in the space domain.

18. The system as defined by claim 11 wherein a selective one of said first and second coordinate transformation means includes an acousto-optical cell coupled to the signal to be transformed and having a monochromatic light source directed thereto for forming a transmittance pattern of light of said signal to be transformed, first Fourier transform lens means located adjacent said acousto-optical cell and being adapted to perform a Fourier transform on said transmittance pattern, an optical mask having the Fourier transformed transmittance pattern directed thereto, said optical mask having at least one non-linear slit formed therein and being operative to optically effect said predetermined non-linear coordinate transformation on said transmittance pattern in the Fourier domain, second Fourier transform lens means located adjacent said optical mask and being operative to convert the transformed transmittance pattern to the space domain, and means adjacent said second Fourier transform lens means for implementing an output plane of transformed transmittance pattern in the space domain.

19. The system as defined by claim 11 wherein a selective one of said first and second coordinate transformation means includes an acousto-optical cell coupled to the signal to be transformed and having a medium of non-linear signal translation in the direction of signal propagation therein and having a monochromatic light source directed thereto to thereby form a non-linear coordinate transformed transmittance light pattern output of the signal to be transformed.

* * * * *